F. F. WEILENMAN.
FRUIT GATHERER.
APPLICATION FILED MAR. 23, 1918.

1,282,032.

Patented Oct. 22, 1918.
2 SHEETS—SHEET 1.

INVENTOR
Franz F. Weilenman
By John A. Naismith
HIS ATTORNEY

F. F. WEILENMAN.
FRUIT GATHERER.
APPLICATION FILED MAR. 23, 1918.

1,282,032.

Patented Oct. 22, 1918.
2 SHEETS—SHEET 2.

INVENTOR
Franz F. Weilenman
BY John A. Naismith
HIS ATTORNEY

UNITED STATES PATENT OFFICE.

FRANZ F. WEILENMAN, OF SAN JOSE, CALIFORNIA.

FRUIT-GATHERER.

1,282,032.  Specification of Letters Patent.  Patented Oct. 22, 1918.

Application filed March 23, 1918. Serial No. 224,324.

*To all whom it may concern:*

Be it known that I, FRANZ F. WEILENMAN, a citizen of the United States, and resident of San Jose, in the county of Santa Clara and State of California, have invented certain new and useful Improvements in Fruit-Gatherers, of which the following is a specification.

My invention relates to fruit gatherers, and more particularly to a form of fruit gatherer adapted for gathering such fruits as prunes and olives, separating them from twigs, leaves etc., and finally depositing them in suitable boxes. It is the object of my invention to provide a device of the character indicated that will be simple, light, strong, durable, practical, easily changed from tree to tree with or without entirely emptying it of the fruit therein, and easily and quickly adjustable about a tree.

With these and other objects in view, my invention consists in the novel and useful provision, formation, construction, combination and relative arrangement of parts, members and features, all as hereinafter described, shown in the drawings, and finally pointed out in the claims.

In the drawings:—

Similar characters of reference refer to similar parts throughout the several views.

Figure 1:
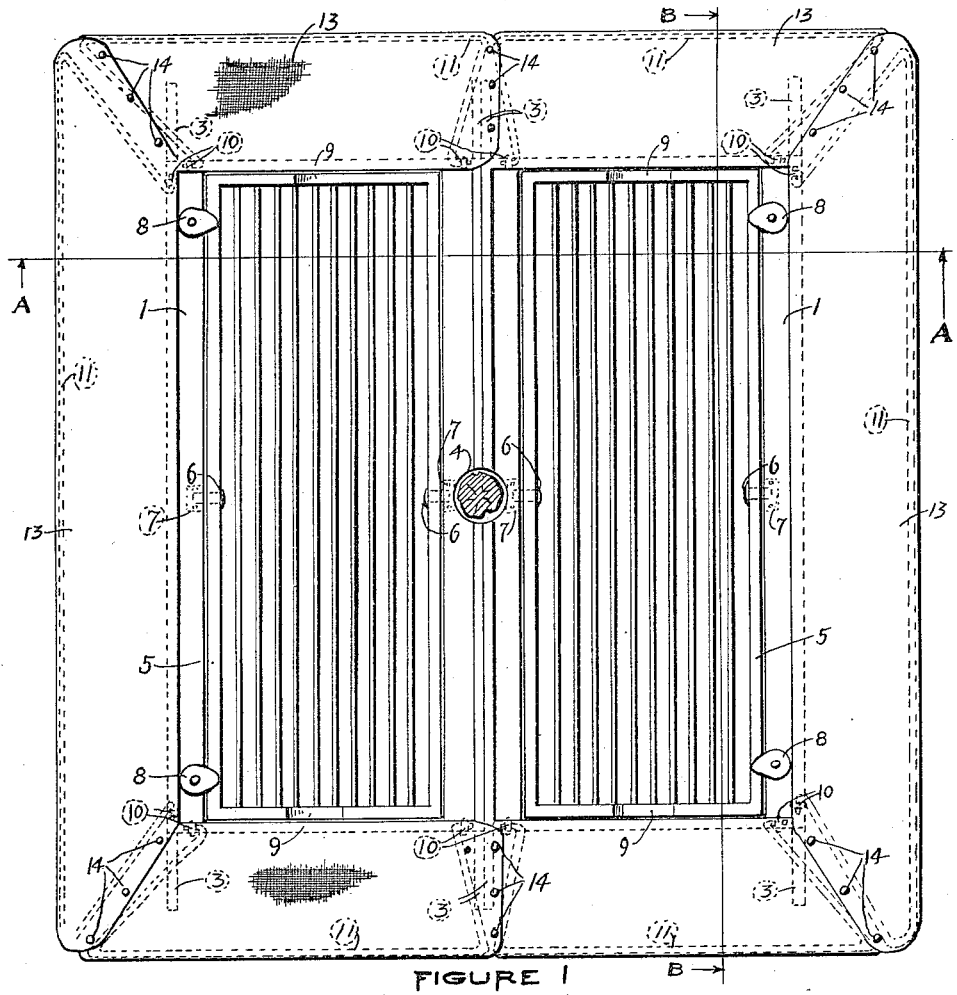
Figure 1 is a plan view of my invention in position about a tree trunk, the latter being shown in section.
Figure 2:
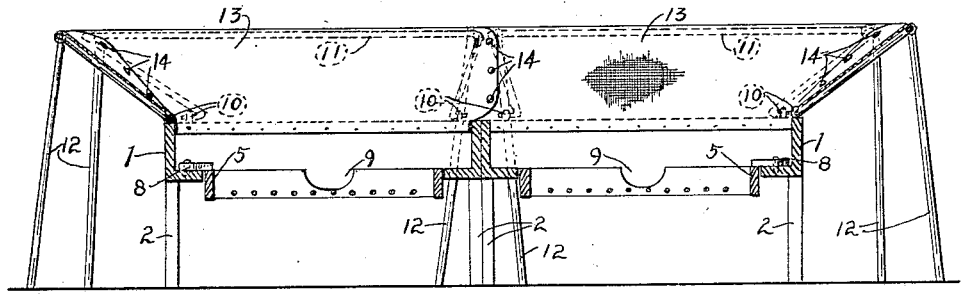
Fig. 2 is a sectional view on line A—A of Fig. 1.
Figure 3:
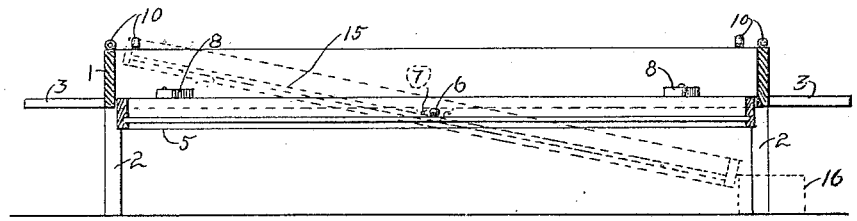
Fig. 3 is a sectional view on line B—B of Fig. 1 with the extension sides removed.
Figure 4:
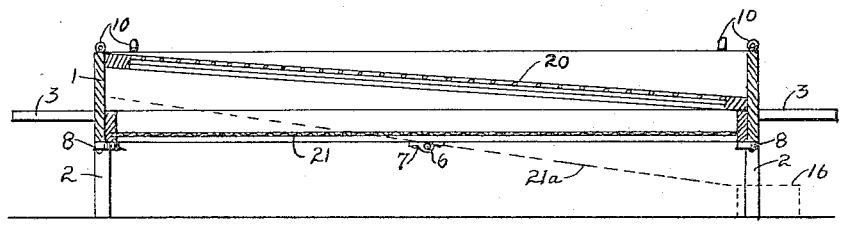
Fig. 4 is a vertical and longitudinal section through the device when fitted with two screens.

Since the device herein illustrated and described consists of two symmetrical halves, a description of one half will apply equally as well to the other half. Each half of the device consists of a rectangular frame 1 provided with legs 2 and handles 3, and has a segment cut out of the central portion of one side to receive a tree trunk as 4. In the bottom of the rectangular frame 1 is positioned a screening member 5 supported on pivots 6 which in turn are set in bearings 7 in frame 1, said member 5 being normally held in a fixed position with relation to frame 1 by eccentrically pivoted buttons 8 mounted on said frame 1. The ends of members 5 are cut away as indicated at 9 to provide openings through which the gathered fruit may be discharged into suitable receptacles.

On each end of frame 1 and on the side opposite that which engages the tree trunk is secured and supported a canvas extension in the following manner. On the upper edge of each end and on the upper edge of said outer side, and near the ends thereof, are positioned eyelets as shown at 10. In each pair of eyelets is positioned a supporting rod 11 formed and bent substantially as shown and having legs attached thereto as indicated at 12. Each rod 11 supports the outer edges of a canvas as 13, the inner edge of said canvas being secured to member 1. The overlapping edges of canvas 13 are preferably supplied with means for attaching them to each other as, for instance, snap buttons as indicated at 14.

Assuming that the device has been assembled and positioned under a tree as above set forth and as shown in Fig. 1, the falling fruit will be deposited upon screening member 5 or guided thereto by canvas extensions 13. When sufficient fruit has accumulated on members 5 a button 8 is turned and the member is tilted as indicated in dotted lines at 15, thereby causing the gathered fruit to roll down into boxes positioned as indicated in dotted lines at 16.

It is understood of course that the members 5 may be made of any convenient size or proportions and fitted with any suitable screening means, in the present instance an arrangement of bars being shown so spaced that the fruit will be caught and the twigs and leaves allowed to fall through to the ground.

In transferring the device from tree to tree the extension sides may be folded over upon the body, each half of the device carried over and positioned under the next tree and the extension sides repositioned, an operation that is quickly and easily performed. If the devise is to be used on sloping ground then the legs may be fitted with extensions as 17, provided with slots 18 and secured in the desired position by binding nuts 19.

The device above described is constructed particularly for use in gathering prunes, but if it is to be used for gathering olives, for instance, then it is found desirable to provide an arrangement of double screens. That is, a sloping screen as 20 may be fixed in position in frame 1, this screen having a mesh just large enough to permit the olives to fall through and to retain the leaves, twigs, etc. The second or bottom screen 21 is pivotally mounted as described in connection with Fig. 1 and has a finer mesh so as to retain the olives until a sufficient number are gathered to deposit in boxes, the screen taking the position indicated by line 21ª when being emptied.

Figures 5, 6:
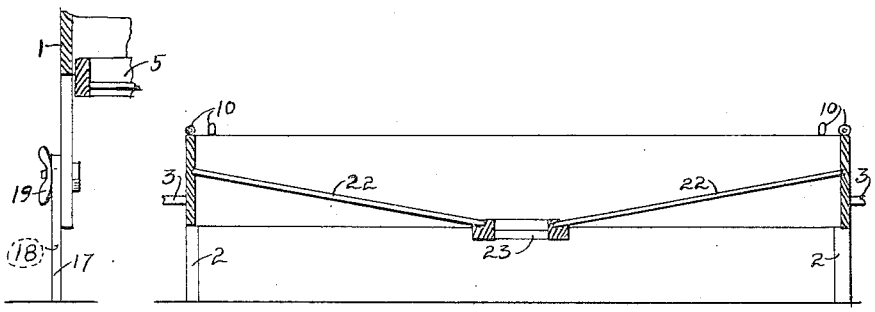
Fig. 5 is a vertical and longitudinal section through the device when provided with a center outlet.
Fig. 6 is a detail illustration showing a leg extension.

It is clear, of course, that many different screen arrangements may be made as, for instance, they may slope toward the center as at 22 and discharge through a trap as at 23 in Fig. 5. It is understood of course, that I do not wish to confine myself to the specific forms of construction and the particular materials herein shown and described, but that changes in form, materials, construction and operation may be made within the scope of the appended claims.

I claim:

1. A fruit gatherer formed of two separable sections having a passage formed in their adjoining sides to permit the passage of a tree trunk therethrough, each section having fruit screening means forming the bottom thereof, and extensible sides attached to each end and the outer side thereof.

2. A fruit gatherer formed of two separable sections having a passage formed in their adjoining sides to permit the passage of a tree trunk therethrough, each section having fruit screening means forming the bottom thereof, and extensible sides removably attached to each end and the outer side thereof, each of said extensible sides consisting of a rod pivotally mounted on said section, a flexible sheet mounted on said rod, and supporting members pivotally mounted on said rod.

3. A fruit gatherer formed of two separable sections having a passage formed in their adjoining sides to permit the passage of a tree trunk therethrough, each section having fruit screening means forming the bottom thereof, and extensible sides removably attached to each end and the outer side thereof, each of said extensible sides consisting of a rod pivotally mounted on said section and bent outwardly a distance to a point adjacent the corresponding bend in the adjacent rod and thence bent inwardly to a line parallel to the edge upon which it is mounted, a flexible sheet mounted on said rod and said edge, means for attaching the edges of adjoining sheets, and legs pivotally mounted on said rods, each of said sections having legs and handles attached thereto.

4. A fruit gatherer formed of two separable sections having a passage formed in their adjoining sides to permit the passage of a tree trunk therethrough, each section having fruit screening means forming the bottom thereof, and extensible sides pivotally mounted upon each end and the outer side thereof, each extensible side having independent supporting means and means for attaching its ends to the ends of the adjoining sides.

5. A fruit gatherer formed of two separable sections having a passage formed in their adjoining sides to permit the passage of a tree trunk therethrough, each section having independently supported side and end extensions pivotally mounted thereon, and a screening member pivotally mounted in the bottom thereof.

6. A fruit gatherer consisting of two sections, each section comprising a body portion or frame provided with legs and handles and having a segment removed from the central portion of one side thereof to receive a tree trunk, means for separating the fallen fruit from leaves, twigs, etc., operatively mounted in the bottom of said frame, independently supported and adjustable extension sides operatively mounted on each end and the outer side of said frame, means for attaching the adjoining ends of said sides together, and to the adjoining ends of the extension sides of the adjacent section.

Signed at San Jose, in the county of Santa Clara and State of California, this 16th day of March, 1918.

FRANZ F. WEILENMAN.

Copies of this patent may be obtained for five cents each, by addressing the "Commissioner of Patents, Washington, D. C."